(12) United States Patent
Ash et al.

(10) Patent No.: US 6,626,659 B1
(45) Date of Patent: Sep. 30, 2003

(54) INJECTION MOLDING METHOD AND APPARATUS HAVING IMPROVED DETACHABLE CLAMPING UNIT WITH HORIZONTAL BOOKING DIES

(75) Inventors: Charles E. Ash, Perrysburg, OH (US); John H. Gillen, Ottawa Lake, MI (US); John M. Clark, Osseo, MI (US)

(73) Assignees: Libbey-Owens-Ford Co., Toledo, OH (US); Roll-Tech, Inc., Reading, MI (US)

(*) Notice: Subject to any disclaimer, the term of this patent is extended or adjusted under 35 U.S.C. 154(b) by 335 days.

(21) Appl. No.: 09/603,564

(22) Filed: Jun. 26, 2000

Related U.S. Application Data
(60) Provisional application No. 60/143,107, filed on Jul. 9, 1999.

(51) Int. Cl.[7] ................................ B29C 45/64
(52) U.S. Cl. .................. 425/190; 425/192 R; 425/589; 425/595
(58) Field of Search ................... 425/116, 117, 425/190, 192 R, 589, 595

(56) References Cited

U.S. PATENT DOCUMENTS

| | | |
|---|---|---|
| 3,577,591 A | 5/1971 | Richards et al. |
| 3,915,617 A | 10/1975 | Saladin |
| 4,269,587 A | 5/1981 | Tranter |
| 4,354,819 A | 10/1982 | Wirz |
| 4,688,752 A | 8/1987 | Barteck et al. |
| 5,061,429 A | 10/1991 | Yoshihara et al. |
| 6,123,535 A | 9/2000 | Ash et al. |

FOREIGN PATENT DOCUMENTS

| | | |
|---|---|---|
| JP | 63199614 A | 8/1988 |
| JP | 01255516 A | 10/1989 |
| JP | 03007314 A | 1/1991 |
| JP | 05237875 A | 9/1993 |
| JP | 06155476 A | 6/1994 |
| JP | 07195415 A | 8/1995 |
| JP | 08112845 A | 5/1996 |
| WO | WO98/05487 A | 2/1998 |
| WO | WO00/34021 A | 6/2000 |

*Primary Examiner*—James P. Mackey
(74) *Attorney, Agent, or Firm*—Marshall & Melhorn, LLC

(57) ABSTRACT

A molding method and apparatus is shown which utilizes a plasticizing or injection unit in combination with a horizontal booking press having a first or moveable mold platen carrying a first portion of a mold or molds, and a second, or fixable, door platen carrying a second portion of a mold or molds. The door platen swings open and closed on a hinge, and is fixable in its closed position. When the moveable mold platen is in its' closed position adjacent the fixed position of the door platen, a mold cavity is formed by the first and second portions of the mold or molds, and material is injected into the mold cavity.

11 Claims, 7 Drawing Sheets

INJECTION MOLDING METHOD AND APPARATUS HAVING IMPROVED DETACHABLE CLAMPING UNIT WITH HORIZONTAL BOOKING DIES

This application is claiming the benefit, under U.S.C. §119(e), of the provisional application filed Jul. 9, 1999 under 35 U.S.C. §111(b), which was granted a Ser. No. 60/143,107. The provisional application, No. 60/143,107, is hereby incorporated by reference.

BACKGROUND OF THE INVENTION

1. Field of the Invention

The present invention relates to an improved method and apparatus for injection molding of thermoplastic materials. More particularly, the present invention relates to an improved apparatus for injection molding having an improved clamping unit. Most particularly, the present invention relates to an improved apparatus for injection molding which comprises a stand alone injection molding unit in combination with a separate, detachable, horizontal booking press to provide a readily movable clamping unit having easy access to both halves of the injection mold.

2. Discussion of the Related Art

Injection molding has long been a preferred method of molding where high production rates, fully automatic operation, and reduced material costs are considerations. Further, a wide range and combination of colors can be molded. Materials customarily molded by the injection method includes cellulose acetates, cellulose acetate-butyrate, polystyrene, polyvinyl chloride, acrylic and vinylide chlorides.

The presently known injection molding machine consists of two basic components. The injection or plasticizing unit, and the clamping unit. The injection unit is where the raw material, usually in pellet form, is converted, melted, or plasticized to a condition where it can be injected into the mold. A reciprocating screw is used to convey the material to the front of the screw. Once the material has collected in front of the screw, hydraulic pressure forces the screw forward, thereby injecting the plastic into the mold.

The clamping unit is the mechanism on which the molding dies are mounted, and applies the force to the mold during the injection cycle to prevent the molds from being forced apart. Injection molding pressures can exceed 30,000 pounds per square inch, so the clamp must be able to maintain high pressure in order to keep the mold closed during injection.

Injection molding machines are widely known in the art. Commonly used injection molding machines are those available from Hettinga Equipment, Inc., Des Moines, Iowa 50332, Cincinnati Milicron, Batavia, Ohio 45103, Husky Injection Molding Systems, Inc., Bolton Ontario, Canada L7E, 5S5 and Toshiba Machine Company of America, Elk Grove Village, Ill. 60007.

However, in spite of their popularity, injection molding machines have certain disadvantages because of their large size and the high pressures used in injection molding. This has led to rather large high cost units with fairly inaccessible molding dies. Even though injection molding may be favored for certain applications, the fact that the dies are not easily accessible or interchangeable limits such application.

Also, because injection molding machines are rather large, and not easily moveable, they are usually located some distance away from the end user of such parts, and are not easily located near the end user or on a production line for example. In addition, since the known injection molding dies include a moveable part and a stationary part which are in a closely spaced opposed relationship, such injection molding machines can not easily be used for other than the making of an entire thermoplastic part. For example, they can not easily be used for molding, for example, a polyvinyl chloride part onto a sheet of material because the sheet of material can not easily be inserted in the mold cavity.

Thus, those skilled in the art have continued to search for a way to provide an injection molding unit which lighter, is of a smaller size, has full access to the molding dies, can "mold onto" another part, can be used at or near the point of need, and has easily changeable, or interchangeable clamping units to provide for quick changeover between parts with minimal downtime of the injection or plasticizing unit.

SUMMARY OF THE INVENTION

The aforementioned problems are addressed in accordance with the present invention by combining a known plasticizing or injection unit with a horizontal booking press to provide a novel apparatus and method not hereto found in the prior art.

In one embodiment of the invention, a horizontal booking press is connected to an injection or plasticizing unit.

In another embodiment of the present invention, a horizontal booking press is connected to a stand alone injection or plasticizing unit.

In a further embodiment of the present invention, a horizontal booking press is interchangeably connected to a stand alone injection molding unit.

In a further embodiment of the invention, the foregoing horizontal booking press has a first, or moveable, mold platen which may hold, or have affixed to, or carry, a base portion of a mold or molds. A second, or door, platen may hold, have affixed to, or carry, a core or cavity portion of a mold or molds. The second, or door, platen is hingedly connected to the frame of the horizontal booking press to swing open and closed like a cover of a book with respect to the moveable mold platen.

In a still further embodiment of the invention the moveable mold platen is reciprocated or moved by a link and toggle arrangement.

In a still further embodiment of the invention the moveable mold platen is reciprocated or moved by a rack and pinion arrangement.

In a still further embodiment of the invention the moveable mold platen is reciprocated or moved by a ball screw arrangement.

In a still further embodiment of the invention the moveable mold platen is reciprocated or moved by hydraulic cylinders.

In a further embodiment of the invention, an injection molding apparatus of the foregoing nature is provided in which the horizontal booking press is light in weight and easily moveable from place to place as needed.

In a further embodiment of the present invention, an injection molding apparatus of the foregoing nature is provided wherein the whole horizontal booking press is interchangeable with other horizontal booking presses as needed.

In another embodiment of the invention a self-contained injection molding apparatus of the foregoing nature is provided.

Thus, one of the objects of the present invention is to provide a novel molding method and apparatus for injection molding a part.

Another object of the present invention is to provide an injection molding apparatus which has fully accessible mold portions.

Another object of the present invention is to provide a self-contained injection molding apparatus which may produce a part at the site where it is needed, or sufficiently nearby, to essentially save the cost of shipping manufactured parts to the site.

Another object of the present invention is to provide an injection molding apparatus which can injection mold plastic parts onto other parts which may be inserted into the fully accessible mold or mold portion or portions.

Further objects and advantages of the present invention will be apparent from the following description and appended claims, reference being made to the accompanying drawings forming a part of the specification, wherein like reference characters designate corresponding parts in the several views.

Figure 1:
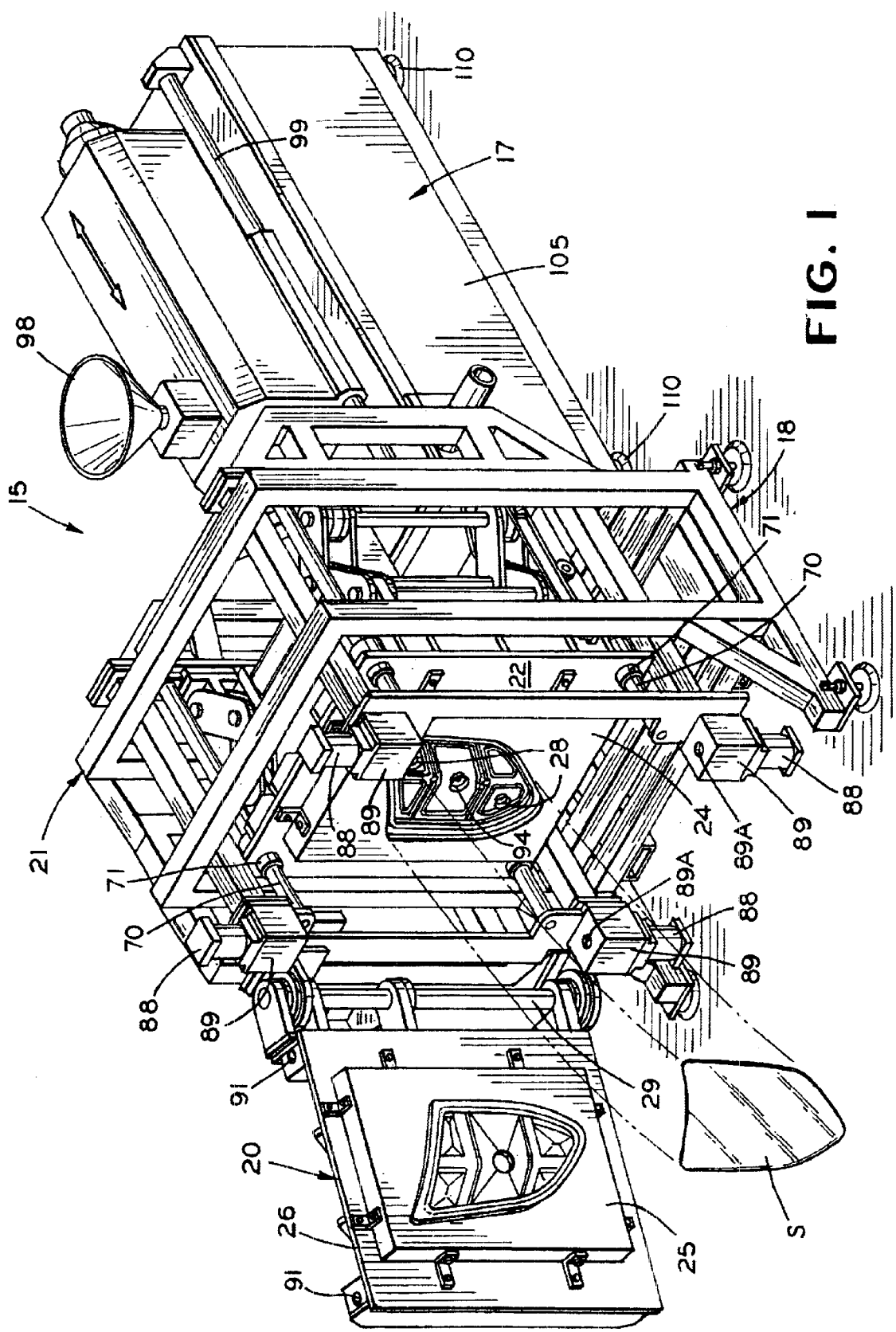
FIG. 1 is a perspective view of a construction embodying the present invention.

It is to be understood that the present invention is not limited in its application to the details of construction and arrangement of parts illustrated in the accompanying drawings, since the invention is capable of other embodiments, and being practiced or carried out in various ways within the scope of the claims. Also, it is to be understood that the phraseology and terminology employed herein is for the purpose of description, and not of limitation.

DESCRIPTION OF THE PREFERRED EMBODIMENT

In order to solve the aforementioned problems with injection molding units, applicants have adapted the compact molding apparatus and method which is the subject of copending application Ser. No. 09/452,790 filed Dec. 2, 1999 to work with modified stand alone injection molding units available from the aforementioned manufacturers. There is shown an improved injection molding apparatus, generally designated by the numeral 15, which may be self contained. The injection molding apparatus 15 includes an injection unit 17, which may be of the stand alone type, and a horizontal booking press 18.

The horizontal booking press 18 includes a frame 21, generally of a parallelipiped nature. In the preferred embodiment, the frame 21 is upright or vertical. It should be understood, however, that the frame 21 may be tilted, if desired. A moveable mold platen 22 is attached to the frame 21. Also attached to the frame 21 is the door platen 26, which is attached by a first hinge means 29. The door platen 26 swings open and closed like the cover of a book.

The door platen 26 closes into position above the moveable mold platen 22. The moveable mold platen moves toward and away from the door platen 26. A mold or molds 23 (FIG. 4) are contained in the space defined by the retracted position of the moveable platen 22 and the closed position of the door platen 26. The mold may extend laterally past the edges of the door platen 26 and the moveable mold platen 22, if desired. A portion of the mold may be moveable with the door platen 26 and/or the mold platen 22, depending upon the particular application to which the method and apparatus of the present invention is applied.

The preferred embodiment of the present invention is described in connection with its use to encapsulate, or injection mold onto, a sheet of frangible material, such as a sheet S of glass. The mold 23 illustrated forms no part of the present invention.

In one such use of the present invention, the injection molding apparatus is used to encapsulate at least a portion of a sheet of material, and includes a first desired portion of a mold, or mold base attached to moveable mold platen. Cooperating with the mold base is a second desired portion of a mold, or a mold core, or mold cavity, attached to a fixed or fixable platen, such as a door platen.

A vacuum head or heads may be provided in the mold base and/or mold core to hold a sheet of material in proper relationship thereto, such that all or a portion of a sheet of material will be encapsulated when at least one mold core is positioned by a fixable or fixed mold platen in a mating or facing relationship with the mold base attached to the moveable mold platen, and a thermoplastic molding material is introduced into the mold cavity formed by the mold base and the mold core or cavity.

In another such use of the present invention, the injection molding apparatus of the present invention has a moveable mold platen, and a door platen rotatable into an opposed or facing relationship with said moveable mold platen. A suitable mold base will be attached to the moveable mold platen, and a suitable mold core or cavity will be attached to said door platen. A sheet of glass to be encapsulated will be interposed between the mold base and the mold core or cavity. The sheet of glass may define and/or become part of the mold cavity. The portions of the glass surface and periphery on which a molding material will be deposited may be further defined by seal means. Provisions may be made in one or both of the mold base and the mold core or cavity to hold brackets, hinges, or the like to be encapsulated either on the periphery or the surface of the sheet of material.

In another such use of the present invention, a glass sheet having had a ceramic enamel band previously applied thereto is placed into a mold base attached to said moveable mold platen and held in place by a vacuum head or heads. A mold core or cavity is attached to the door platen. The door platen is closed or rotated into position so that the facing surfaces of the mold base and the mold core or cavity are adjacent. The door platen is fixed into position by suitable means before the molding operation begins. The mold base is moved into position adjoining the mold core or cavity by the moveable mold platen. Thermoplastic molding material is introduced into the mold cavity defined thereby to encapsulate one or more edges of the sheet of glass.

It should be understood that even though the preferred embodiments are shown encapsulating or injection molding onto a sheet of frangible material S, such as glass, the improved injection molding apparatus of the present invention may be used for all purposes and all uses that prior art injection molding apparatus may perform.

Referring now to FIGS. 1–6, a first desired portion of a mold (or molds) 23, such as a first desired portion of a mold, or mold base 24, may be attached to moveable mold platen 22. A second desired portion of a mold, (or molds) 23, which may be such as a mold core, or mold cavity 25 is fixedly attached to second, or door, platen 26. Door platen 26 is moveable into and out of a fixable or fixed position with relation to the moveable mold platen 22 by the first hinge means 29. First hinge means 29 will allow door platen 26 to swing open and shut when first fluid cylinder 30 advances or retracts shaft 31.

Shaft 31 is attached by yoke 32 to hinge arm 33. It can be seen that when shaft 31 is reciprocated, hinge arm 33 will rotate the hinge pin 34.

It should be understood that the term "stationary", when used to describe the second or door platen 26, describes the position of the platen after the platen has been closed and the platen has been fixed in position. This occurs immediately before the moveable mold platen 22 advances the mold base 24 into an adjacent or engaging relationship with the mold core 25.

In one of the preferred embodiments, the door platen 26 (when closed) is shown in an opposed parallel relationship with a moveable mold platen 22. However, it can be understood that, depending on the application, the fixed position of the door platen 26, when closed, may be at any desired stationary fixed position, depending on the mold 23 being used, the shape of the part being molded, or other factors, and be well within the scope of the present invention.

In the preferred embodiment, the moveable mold platen 22 is moved toward and away from the door platen 26 in an opposed, facing relationship. It can be understood that, while in the preferred embodiment the door platen 26, and the moveable platen 22, remain in a 180° opposed relationship during molding, other relationships during the molding operation are well within the scope of the present invention.

Figure 2:
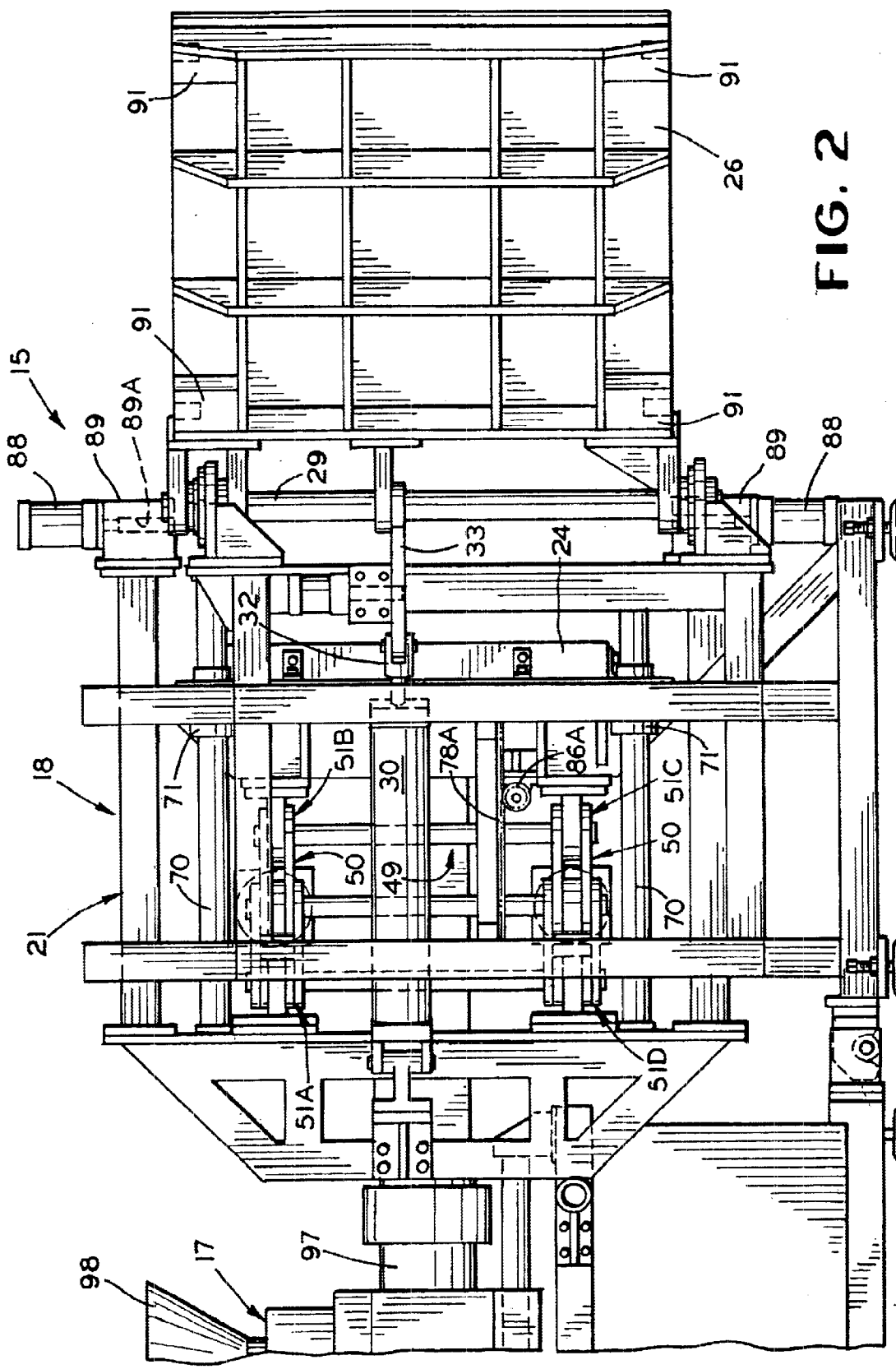
FIG. 2 is a partial elevational view of the construction shown in FIG. 1, with the door platen shown in its opened position.
Figure 3:
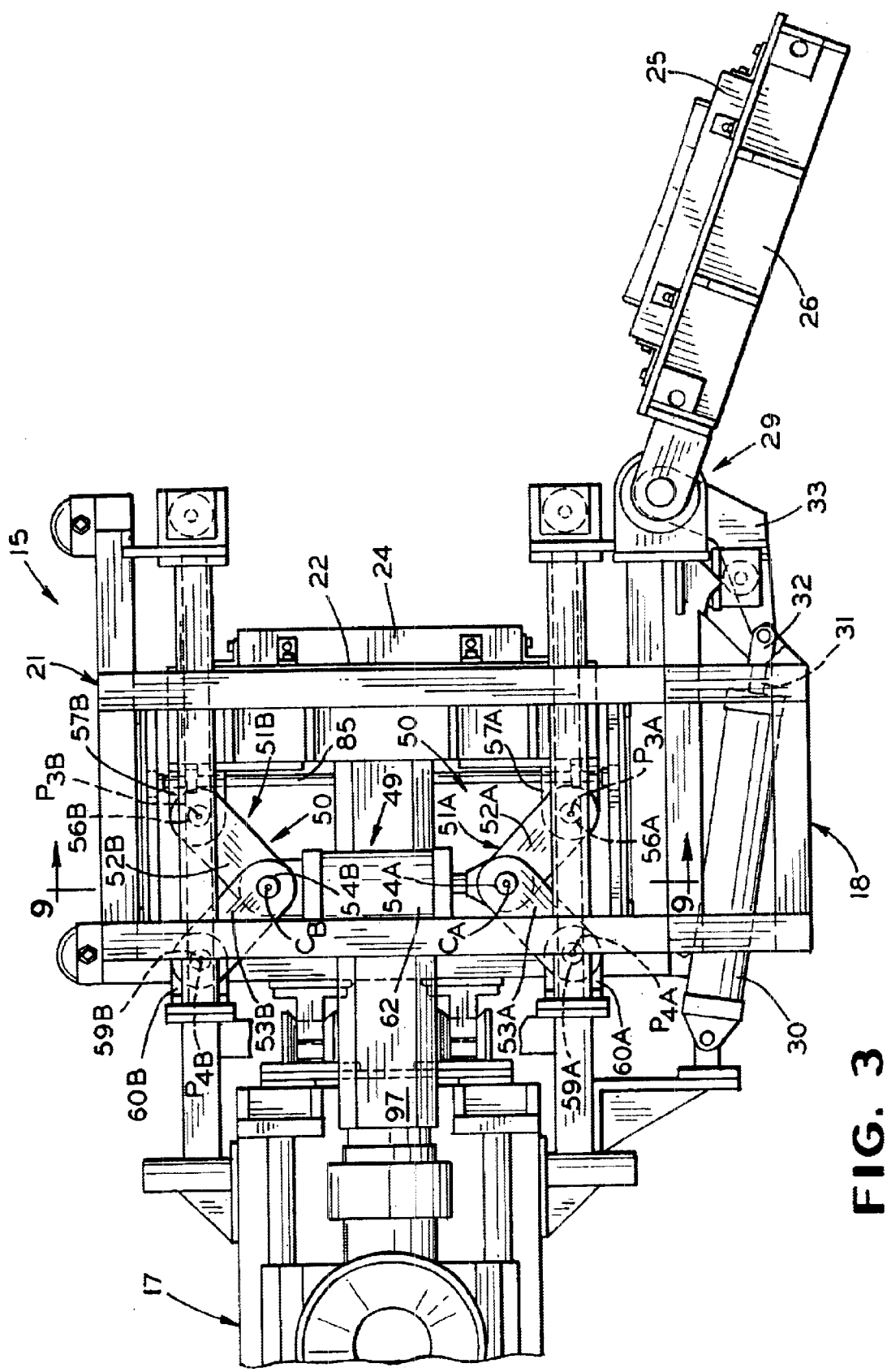
FIG. 3 is a top plan view of the construction shown in FIG. 2 with the door platen in its open position.
Figure 4:
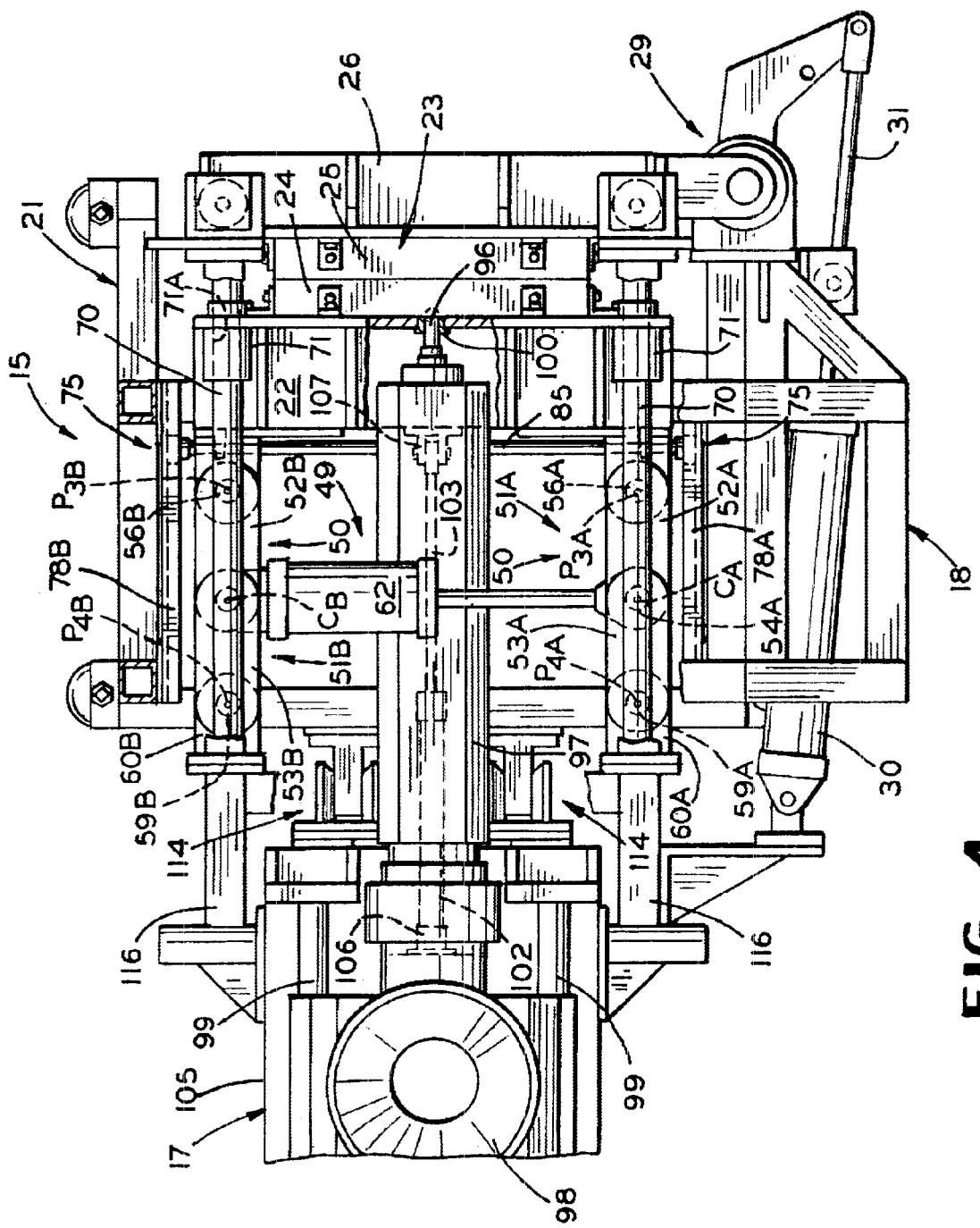
FIG. 4 is a view similar to FIG. 3, but showing the door platen in its closed position.
Figure 5:
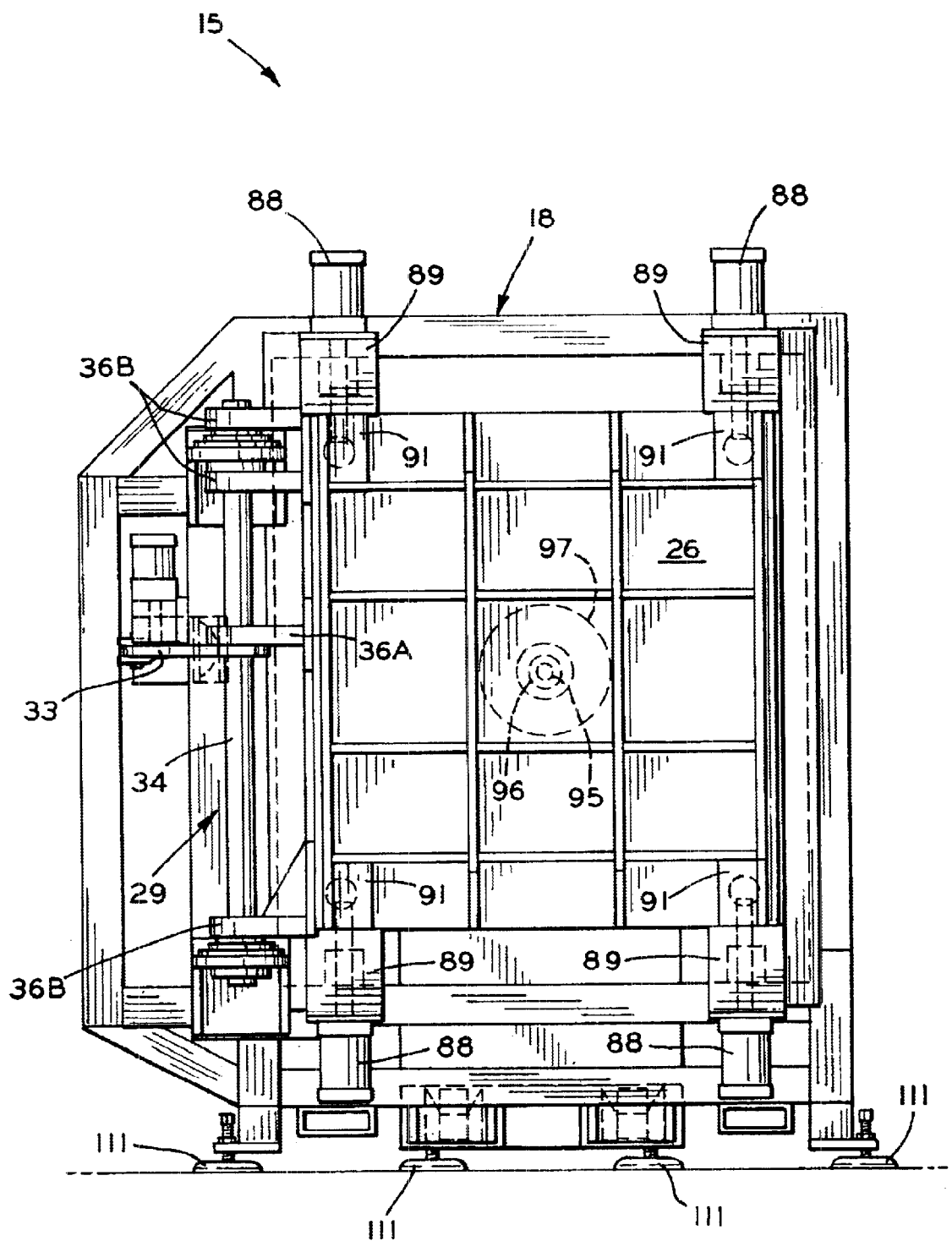
FIG. 5 is an end view of the construction shown in FIG. 2.

Referring to FIGS. 2–4, the movement of the moveable platen 22 is accomplished by a reciprocating means 49. Two pairs of opposed toggle mechanisms 50 comprise the reciprocating means 49. Each of said pair of opposed toggle mechanisms 50, in turn, comprise an opposed pair of toggle joints (51A, 51B). Since each pair of opposed toggle joints (51A, 51B) is substantially identical, only one need be described herein, and identical reference numerals (with appropriate suffixes) will be placed on the other of said pair of opposed toggle joints. It can also be understood that, depending on the application, other reciprocating means well known in the art may be used.

Each toggle joint (51A,51B) has a first link (52A,52B) and a second link (53A,53B), which are connected at the center ($C_A$,$C_B$) by second shaft (54A,54B). First link (52A, 52B) is free to pivot about pivot point ($P_{3A}$,$P_{3B}$) which is on the center line of third shaft (56A,56B) carried in bearing block (57A,57B). Bearing block (57A,57B) is attached proximate one corner of movable platen 22.

Second link (53A,53B) is similarly free to pivot about second pivot point ($P_{4a}$,$P_{4B}$). Second pivot point ($P_{4a}$,$P_{4B}$) is on the center line of fourth shaft (59A,59B) carried by a second bearing block (60A,60B). Second bearing block (60A,60B) is attached to frame 21 in a 180° opposed relationship to first bearing block (57A,57B).

Toggle fluid cylinder 62 is connected for operation between the center $C_A$ of the first of said pair of opposed toggle joints 51A, and the center $C_B$ of the second of said pair of opposed toggle joints 51B. Expansion and contraction of the toggle fluid cylinder 62 will cause the moveable platen 22 to move between its open or retracted position, shown in FIG. 3, and its expanded or closed position, shown in FIG. 4.

To insure that the movement of the moveable platen 22 toward and away from the door platen 26 is smooth, and in the desired direction, the moveable platen 22 moves on a plurality of tie bars 70. In the illustrated embodiment, four tie bars 70 are used. Each tie bar 70 is attached at both of its ends to the frame 21 in a manner such that each tie bar 70 is parallel to each, other, tie bar 70. Each tie bar 70 passes through a tie bar bearing 71 attached to said moveable platen 22 proximate a corner thereof. Suitable openings 71A are placed in the moveable platen to permit the tie bars 70 to pass through.

To prevent twisting or jamming of the moveable platen 22 when the toggle fluid cylinder 62 operates, a geared anti-jamming means 75 is provided. Referring to FIGS. 2,4,9, and 10, there is shown an anti-jamming mechanism 75 in the form of a rack and pinion assembly.

Rack and pinion assembly 77 includes a pair of racks (78A,78B) mounted in a parallel, spaced, relationship to frame 21 with the aid of a pair of L-shaped supports (79A,79B). L-shaped supports (79A,79B) are mounted to spacers (80A,80B), which are, in turn, fastened to frame 21.

A pair of bearing blocks (83A,83B) are mounted to the underside of moveable platen 22 in an axially aligned relationship to support shaft 85 for rotation. To each end of shaft 85 is mounted a pinion gear 86. Each pinion gear 86 preferably has an identical number of teeth, and engages its' respective rack (78A,78B).

It can be seen that as moveable platen 22 travels along tie bars 70, racks (78A,78B) engaging pinion gears (86A,86B) cause shaft 110 to rotate. As long as movable platen 22 is advancing or retracting evenly toward and away from the door platen 26, shaft 85 and pinions (86A,86B) just perform a follower motion. However, if moveable platen 22 tends to twist or move unevenly on the tie bars 70, the anti-jamming means 75, which include racks (78A,78B), L-shaped supports (79A,79B), spacers (80A,80B), bearing blocks (83A, 83B), shaft 85 and pinion gears (86A,86B) will resist such motion.

Any attempt by moveable platen 22 to advance unevenly will tend to rotate one of said pinions (86A,86B) faster than the other of said pinions (86A,86B). Since both of said pinions are fixedly attached to the shaft 85, this will tend to twist shaft 85. Since the force required to twist shaft 85 is more than the force required to resist the force of the toggle mechanisms 51A–D, the side of the moveable platen 22 which is attempting to overrun will be slowed down, allowing the other side to catch up, and a smooth and even motion to continue.

Other types of anti-jamming mechanisms may be used. The cross-link anti-jamming mechanism disclosed in applicants' co-pending application Ser. No. 09/452,790 filed Dec. 2, 1999 may be used. A synchronous ball screw arrangement may also be used. Any suitable anti-jamming mechanism which prevents the twisting of the moveable mold platen 22 is well within the scope of the present invention.

To insure that the fixable or fixed platen 20, such as door platen 26, remains in a fixed position with the moveable mold platen 22 during the molding operation, fluid cylinders 88 (FIG. 2) are provided proximate the four corners of the frame 21. The fluid cylinders 88 are mounted to mounting blocks 89 containing shaft bearings 89A. Shaft bearings 89A carry moveable shafts 90 operated by the fluid cylinders 88 which, with the use of appropriate control means well known in the art, allows the moveable shafts 90 to engage door shaft bearings 91 mounted proximate the four corners of the door platen 26. This insures that the door platen 26 remains closed against the pressure of the injection molding material entering the sprue 94 (FIG. 4) in the mold 23, and more particularly, in the first desired portion of the mold or mold base 24.

A suitable injection molding material enters the sprue 94 through the orifice 95 in the nozzle 96 carried by the injection molding unit 17 forming a part of the improved injection molding apparatus 15 of the present invention.

The typical injection molding unit 17 has a screw and barrel assembly 97. Communicating with one end of the reciprocating screw and barrel assembly 97 is the feed hopper 98 containing the raw molding material. The feed hopper 98 is in communication with the reciprocating screw and barrel assembly 97 where, as well known in the art, the material in the feed hopper 98 is plasticized or converted to a phase where it can be pushed or injected into the mold. A reciprocating screw is used to convey the material to the front of the screw. Once the material has collected in front of the screw, hydraulic pressure forces the screw forward, thereby injecting plastic into the mold through the nozzle 96, orifice 95, sprue bushing 100 (FIG. 4), and sprue 94, into the mold base 24.

The nozzle 96 connects through the reciprocating screw and barrel assembly 97 to the sprue bushing 100 of the mold and forms a seal between the barrel and the mold. When the barrel is in its full forward processing position, the radius of the nozzle should nest and seal in the concave radius in the sprue bushing. At the end of the molding process, during the purging of the nozzle, the barrel backs out from the sprue so the purging compound can fall free from the nozzle.

In the improved plasticizing unit 17 of the present invention, a novel apparatus is used to accomplish this. Not only must the barrel assembly 97 back out from the sprue busing 100, but the sprue bushing 100 also moves with the moveable platen 24. To accommodate this (FIG. 4), a barrel fluid cylinder 102, having reciprocating shaft 103, is connected, using connecting means known in the art, to the base 105 of the injection molding unit 17, using adapter 106. The shaft 103, at its distal end, is connected to a yoke 107 connected to the rear of the moveable platen 24. The barrel fluid cylinder 102 will usually be hydraulic in nature, and be provided with a suitable fluid supply and fluid controls well known in the art.

Pressure will be applied to the cylinder 102 to bring the nozzle 96 into its fully extended processing position nesting within sprue bushing 100. Upon completion of the molding operation, the rearward movement of the mold base 24 will force the rotatable screw and barrel assembly 96 and the feed hopper 98 rearwardly along the rails 99 mounted on the base 105. A further extension of the cylinder 102 will move the nozzle 96 out of the sprue bushing 100 so purging of the nozzle, if required, may take place before the next molding operation. A substantially reverse operation of the fluid cylinder 102 will be used at the beginning of the next molding operation.

Figure 6:
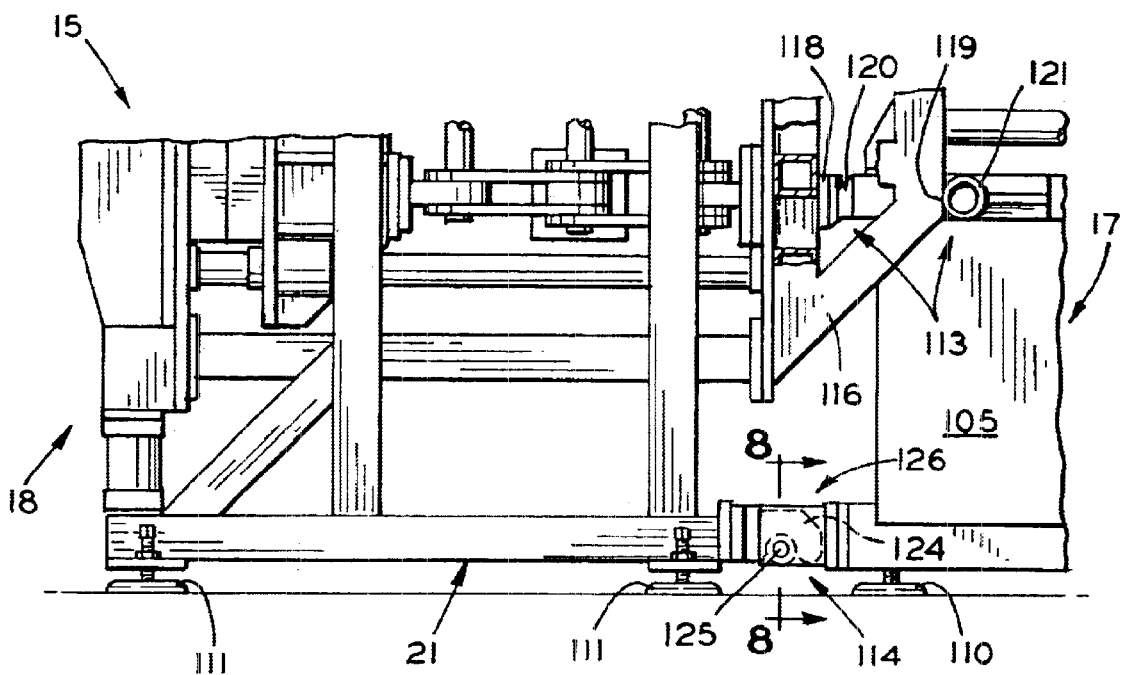
FIG. 6 is a partially cut-away, elevational, view showing a construction embodying the present invention wherein a horizontal booking press is shown connected to a stand alone injection or plasticizing unit in its operating configuration.
Figure 7:
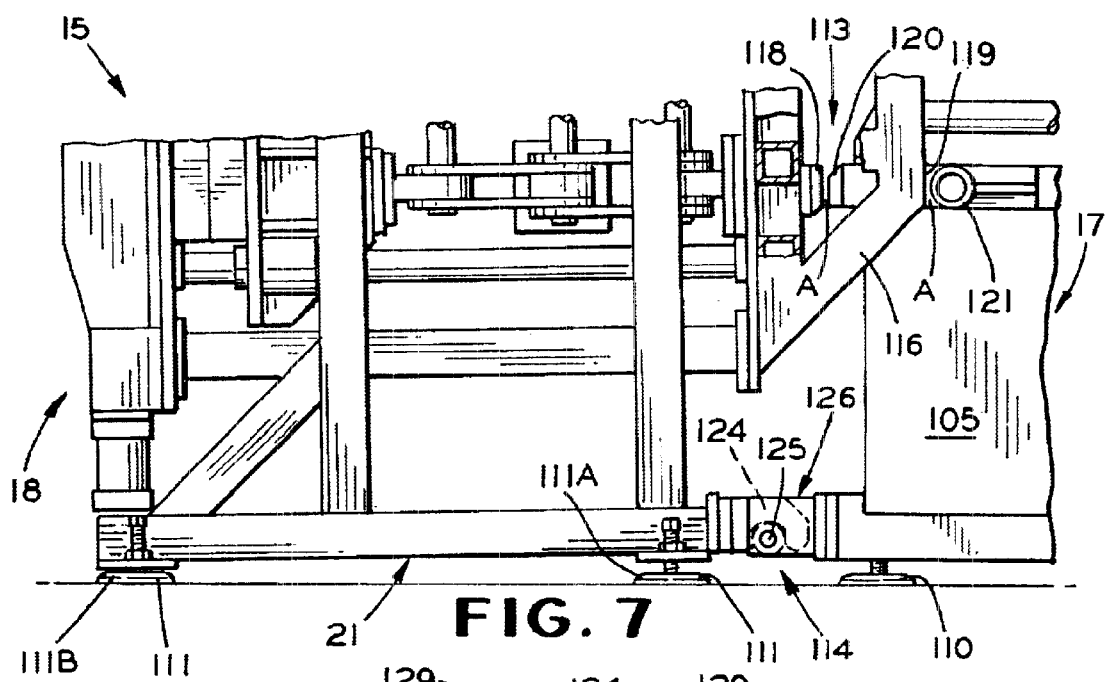
FIG. 7 is a view similar in part to FIG. 6, but showing the horizontal booking press in a tilted position, just before removal from the injection or plasticizing unit.
Figure 8:
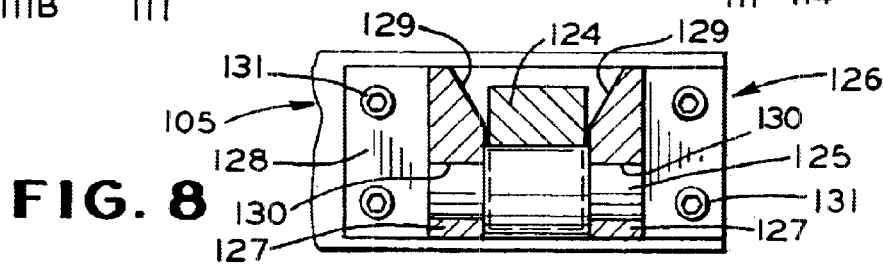
FIG. 8 is a sectional view, taken in the direction of the arrows, along the section line 8—8 of FIG. 6.
Figure 9:
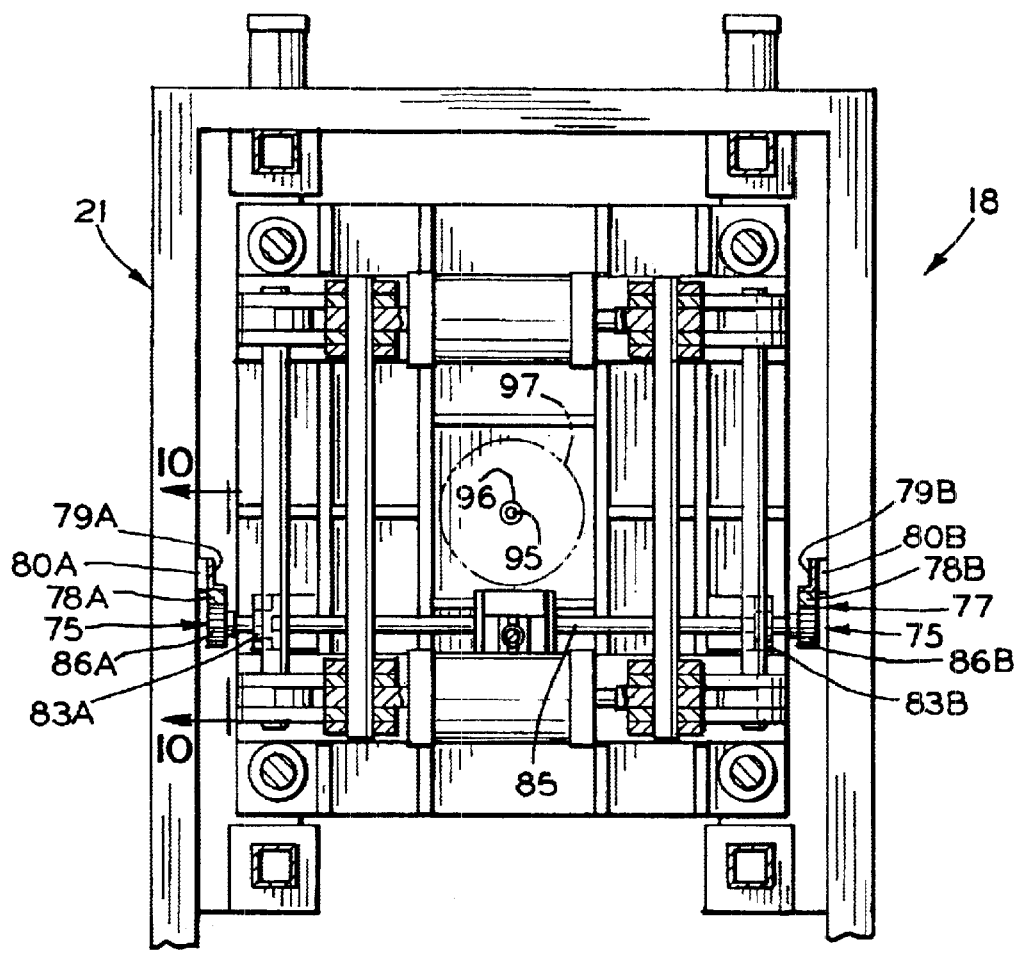
FIG. 9 is a sectional view, taken in the direction of the arrows, along the section line 9—9 of FIG. 3.
Figure 10:
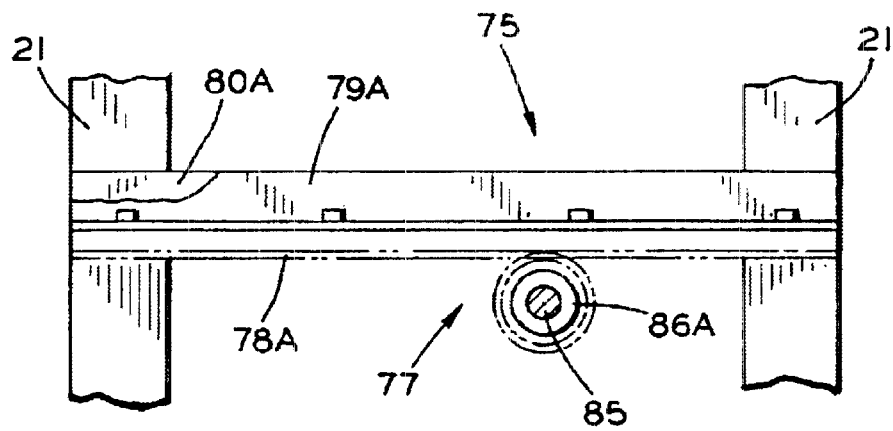
FIG. 10 is a sectional view, taken in the direction of the arrows, along the section line 10—10 of FIG. 9.

Referring now to FIGS. 6–8, it can be seen how the present invention provides for a detachable clamping unit with fully accessible molds. The base 105 of the injection molding unit 17 will normally have adjustable feet 110, at least at the four corners thereof, so that the base 105 may be adjusted such that the reciprocating screw and barrel assembly 97 travels in a predetermined desired (usually horizontal) path of movement. In order that the nozzle 96 enter the sprue bushing 100 provided in the mold base 24, the sprue bushing should be substantially horizontal. This requires that the mold base 24 and the mold cavity 25 need to be adjusted to a precise vertical orientation.

In order to insure this, a second plurality of adjustable feet 111 are provided at predetermined desired positions on the bottom of the frame 21. FIG. 6 shows the stand alone injection molding unit 17 in its attached or operable position, while FIG. 7 shows the stand alone clamping unit 18 in a position just before its detachment from the base 105 of the stand alone injection molding unit 17. The attachment or connecting, and detachment or disconnecting, of the horizontal booking press 18 from the stand alone injection unit 17 involves an abutment mechanism 113, and an attachment mechanism 114.

A pair of frame extensions 116 are provided proximate the rear of the frame 21, and extending rearwardly. The frame extensions are laterally spaced apart a sufficient distance to clear the base 105 of the injection molding unit 17. The frame extensions 116 are provided with a plurality of first protuberances or bosses 118, and a usually equal number of bearing surfaces 119. Each boss or protuberance 118, in the closed position shown in FIG. 6, comes up against or abuts first abutment surface 120, which is preferably flat. Each bearing surface 119 will abut a second abutment surface 121, which is preferably cylindrical, and may be in the form of the laterally, horizontally, extending hollow cylinder shown.

It can now be seen that, in the immediate post attachment or pre-detachment position shown in FIG. 7, there is a space A between each boss or protuberance 118 and each first abutment surface 120. There is also a space A between each bearing surface 119 and each second abutment surface 121. This will allow detachment and attachment of the horizontal booking press to the stand alone injection molding unit 17 in the manner to be described immediately below.

The attachment mechanism may include such as at least one hook 124 attached to the frame 21 proximate its lower portion. The hook or hooks 124 engage a pin or pins 125 carried in hook receptacle 126. Each hook receptacle 126 includes a pair of spaced apart plates fixedly attached to backing plate 128 in a spaced apart parallel orientation. Plates 127 may be mirror images as shown in FIG. 8. The plates 127 each have axially aligned openings 130 which accepts a pin 125. The receptacle 126 is attached to the base 105 in a predetermined desired position by the bolts 131.

To detach the horizontal booking press 18 from the stand alone injection molding unit 17 when desired, each outboard foot 11B on the horizontal booking press 18 is lowered or retracted to at or near the maximum extent, causing the horizontal booking press 18, through the hook or hooks 124, to pivot about the pin or pins 125, and therefore provide the spaces A between each boss or protuberance 118 and each first abutment surface 120, as well as between each bearing surface 119 and its respective abutment surface 121, as shown in FIG. 7. It is presumed that the nozzle 96 has been retracted away from the sprue bushing 100 before this operation takes place.

With these spaces or clearances, fork lift tines may be inserted under the frame 111, and the horizontal booking press 118 may be lifted a sufficient distance for the hook or hooks 124 to clear the pin or pins 125, and then the horizonal booking press 18 may simply be moved horizontally away from the stand alone injection molding unit 17.

Another horizontal booking press may quickly and easily be moved into place and attached to the stand alone injection unit 17 so that a new injection molded part can be run with virtually no down time of the injection molding unit. The fully accessible molds and the detachable and interchangeable clamping unit of the present improved molding apparatus provide great flexibility heretofore not found in injection molding method operations. Thus, a novel and improved injection molding apparatus has been provided.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An injection molding apparatus comprising:
    a) an injection unit having a base, and a means for leveling said injection unit attached to said base;
    b) a clamping unit and a frame extending vertically therefrom, said clamping unit having a fully accessible mold and being fully interchangeable with another clamping unit; said clamping unit comprising a horizontal booking press; and
    c) an attachment means for connecting said clamping unit to said injection unit, said attachment means comprising an abutment mechanism and an attachment mechanism.

2. The molding apparatus defined in claim 1, said leveling means comprising adjustable feet, located at predetermined locations on, and adjustably attached to, said base of said injection unit.

3. The molding apparatus defined in claim 2 wherein said abutment mechanism further comprises at least one extension extending rearwardly from a rear portion of said frame.

4. The molding apparatus defined in claim 3 wherein said abutment mechanism further comprises a pair of extensions extending rearwardly from the rear portion of said frame of said clamping unit.

5. The molding apparatus defined in claim 4, wherein said frame extensions are laterally spaced apart a sufficient distance to clear said base of said injection unit.

6. The molding apparatus defined in claim 5, wherein said abutment mechanism includes:
    a) a plurality of protuberances on said frame extensions, and
    b) an equal number of first abutment surfaces on said base.

7. The molding apparatus defined in claim 6, said abutment mechanism further comprising:
    a) a plurality of bearing surfaces on said frame extentions, and
    b) an equal number of second abutment surfaces on said base.

8. The molding apparatus defined in claim 7, wherein said attachment mechanism comprises:
    a) at least one hook attached to said frame proximate a lower portion hereof, and
    b) at least one mating hook receptacle mounted to said base of said injection unit.

9. The molding apparatus defined in claim 8, wherein said hook receptacle further comprises:
    a) a pair of spaced apart plates fixedly attached to said base, and
    b) a pin laterally extending between said spaced apart plates.

10. The molding apparatus defined in claim 9, wherein said hooks pivot around said pins when adjustable feet on said frame are adjusted to a retracted position, thereby providing a space between each protuberance and each first abutment surface, as well as between each bearing surface and each second abutment surface, and providing for removal of said clamping unit from said injection unit when the adjustable feet are adjusted to said retracted position.

11. A compact injection molding apparatus comprising an injection unit and a clamping unit, the clamping unit further comprising:
    a) a frame member;
    b) a moveable mold platen attached to said frame member for substantially reciprocal movement with regard to a fixable door platen in a closed position;
    c) means to move said movable platen, wherein said means to move said movable platen includes a powered actuator connected to said movable platen;
    d) a first portion of a mold attached to said moveable mold platen;
    e) said door platen hingedly mounted to said frame member and fixable in a fixed relationship with regard to said moveable platen when said moveable platen is in an advanced position;
    f) means to move said door platen, wherein said means to move said door platen includes a powered actuator connected to said door platen;
    g) a second portion of a mold attached to said fixable door platen;
    h) means to control said means to move said moveable mold platen and said means to move said fixable door platen;
    i) wherein direct access to said first mold portion is gained through a door opening that is defined in said frame member when said door platen is in the open position;
    j) further, wherein said compact molding apparatus is movable from place to place, as needed; and
    k) an attachment means for connecting said clamping unit to said injection unit, said attachment means comprising an abutment mechanism and an attachment mechanism.

* * * * *